United States Patent [19]

Wixey

[11] Patent Number: 4,667,812
[45] Date of Patent: May 26, 1987

[54] CONVEYOR BELT ASSEMBLY AND METHOD

[75] Inventor: Barry D. Wixey, Utica, Pa.

[73] Assignee: Joy Manufacturing Company, Pittsburgh, Pa.

[21] Appl. No.: 261,745

[22] Filed: May 8, 1981

[51] Int. Cl.$^4$ .................. B65B 15/08; B65B 15/40
[52] U.S. Cl. ..................................... 198/821; 198/847
[58] Field of Search .............. 198/821, 846, 847, 840

[56] References Cited

U.S. PATENT DOCUMENTS

| | | | |
|---|---|---|---|
| 344,563 | 6/1886 | Channell | 198/821 |
| 513,216 | 1/1894 | Summerhayes | 198/821 |
| 550,517 | 11/1895 | Loring . | |
| 660,027 | 10/1900 | Proctor . | |
| 931,991 | 8/1909 | Brooks et al. | 198/821 |
| 1,628,436 | 5/1927 | Segrin et al. . | |
| 2,748,044 | 5/1936 | Seiler | 198/847 |
| 2,864,488 | 12/1958 | Taipale | 198/201 |
| 2,896,773 | 7/1959 | Syce | 198/201 |
| 3,327,839 | 6/1967 | Sigety et al. | 198/202 |
| 3,352,408 | 11/1967 | Thompson | 198/201 |
| 3,901,379 | 8/1975 | Bruhm | 198/182 |
| 4,227,610 | 10/1980 | Gerdes et al. | 198/831 |

FOREIGN PATENT DOCUMENTS

| | | | |
|---|---|---|---|
| 1026351 | 4/1933 | France | 198/847 |
| 2423419 | 12/1979 | France | 198/821 |
| 271440 | 8/1970 | U.S.S.R. | 198/821 |

Primary Examiner—Douglas D. Watts
Attorney, Agent, or Firm—Raymond W. Augustin

[57] ABSTRACT

Apparatus and a method of protecting the lateral edges of a conveyor belt. A resilient tubular member having a longitudinal slit therein is in resiliently maintained contact with the belt adjacent lateral edges. The resilient member may have portions of its inner surface spaced from the belt edge portions so as to define a number of cushioning air spaces therebetween. The resilient members are preferably of generally circular cross sectional configuration in unexpanded condition and are generally coextensive with the belt. The belt may have recesses for receipt of the slit ends of the tubular resilient member. The method may involve providing an elongated tubular resilient member which is slit longitudinally and circumferentially expanded so as to permit it to receive a lateral edge of the belt. The interengagement may be maintained through resiliently maintained contact alone or by additional means for securing such contact.

21 Claims, 7 Drawing Figures 4,667,812

CONVEYOR BELT ASSEMBLY AND METHOD

BACKGROUND OF THE INVENTION

1. Field of the Invention

This invention relates to conveyor belt assemblies and, more specifically, edge protection means for conveyor belts adapted to be used in the transport of minerals, such as coal.

2. Description of the Prior Art

Various types of endless belt conveyors have been known to be employed for a wide variety of end use environments for many years. In general, such systems contemplate an endless belt on which the materials to be transported will be received, will be transported and ultimately discharged, a series of support rollers for maintaining the desired path of travel or shape of the belt during various stages of orbital movement and an appropriate power source which is connected to one or more driven rolls through suitable gear means. It has also been suggested to employ such conveyor systems which are adapted to transport materials over straight as well as curved paths. U.S. Pat. No. 3,237,754 discloses a laterally curved conveyor path for a system adapted for package handling.

It has also been known to provide conveyor belts which have enlarged portions adjacent their lateral edges to resist undesired discharge of materials or to facilitate guidance or driving of the belts. See generally U.S. Pat. Nos. 550,517, 660,027, 1,628,436, 2,864,488, 2,896,773, 3,352,408 and 3,901,379.

U.S. Pat. No. 4,227,610 discloses an endless belt conveyor adapted to be moved in a curved path and having an enlarged lateral edge in contact with a plurality of guide rollers.

One of the problems encountered with respect to mineral or ore carrying conveyor systems, particularly those which are adapted to be flexible systems wherein the conveyor belt moves at least partially along a curved path, is the wear of belt lateral edges as a result of stresses built up on the respective lateral edges in going around curves as well as from contact with guide rollers and other portions of the equipment. There remains, therefore, a need for protecting the lateral belt edges in a manner which is effective, economical and does not interfere with the efficiency of operation of the conveyor system.

SUMMARY OF THE INVENTION

The present invention has solved the above-described problems by providing an efficient means of protecting lateral edges of conveyor belts. In the present invention, an elongated protective means which may take the form of a resilient, generally circular, tubular member is slit longitudinally so as to permit circumferential radial expansion. The protective means is circumferentially enlarged and clamped over the lateral edge or edges of the conveyor belt, preferably in substantially coextensive relationship with respect thereto. The inner surface of the protective means may be so configurated with respect to the belt as to define a series of cushioning air pockets therebetween.

The contact between the protective means and the belt lateral edges may be maintained through the resilient contact alone or may be supplemented by mechanical fasteners or adhesive means or may be substituted for by such means.

In the method of the present invention a tubular, elongated resilient member is slit longitudinally and circumferentially expanded so as to permit sequential or simultaneous insertion of the belt edge therein. After release of the circumferentially expanded tube, effective interengagement between the tubular member and the belt is achieved.

In one embodiment of the invention recess means may be provided in the belt so as to establish mechanical interengagement therebetween.

It is an object of the present invention to provide protective means for a conveyor belt which is economical to employ, easy to install and may be installed in such fashion as to be readily removed for replacement.

It is a further object of the present invention to provide such an assembly wherein the belt edges are not only protected from mechanical wear, but also, in the case of multiply conveyor belts, delamination of the edges is resisted.

It is another object of this invention to provide such apparatus which may be employed without requiring any significant alteration in equipment design or mode of operation.

It is a further object of the present invention to provide a method of protecting a conveyor belt which method may be employed in sequentially or simultaneously securing a protective member to one or both lateral edges of the belt.

These and other objects of the invention will be more fully understood from the following description of the invention on reference to the illustrations appended hereto.

DESCRIPTION OF THE PREFERRED EMBODIMENTS

While the conveyor belt assembly of the present invention may be used advantageously in a number of environments, it is particularly advantageous in connection with conveyor belts adapted to transport loose materials such as ore or other minerals, including coal. Among the specific advantageous uses are those in connection with conveyor belts which are adapted to transport such material along paths which are at least partially curved.

Among the particular systems wherein use of the present invention would be beneficial are the trought conveyor belt systems wherein a precontrolled stretchable belt formed of an elastic material has a chain or other type of stretch-limiting means attached to the longitudinal center line for controlling the amount of stretch of the belt as well as for driving the conveyor belt. Such a system is disclosed in Becker U.S. patent application Ser. No. 82,370, filed Oct. 15, 1979 and entitled "Conveyor Belt Chain and Method for Its Use," owned by the assignee of the present invention, the disclosure of which is expressly incorporated herein by reference. Further disclosure of a type of conveyor system in which the protective features of the present invention may be employed are disclosed in Densmore U.S. patent application Ser. No. 80,760 filed Oct. 1, 1979, entitled "Monorail Suspended Conveyor System" owned by the assignee of the present invention and expressly incorporated herein by reference.

Figure 1:
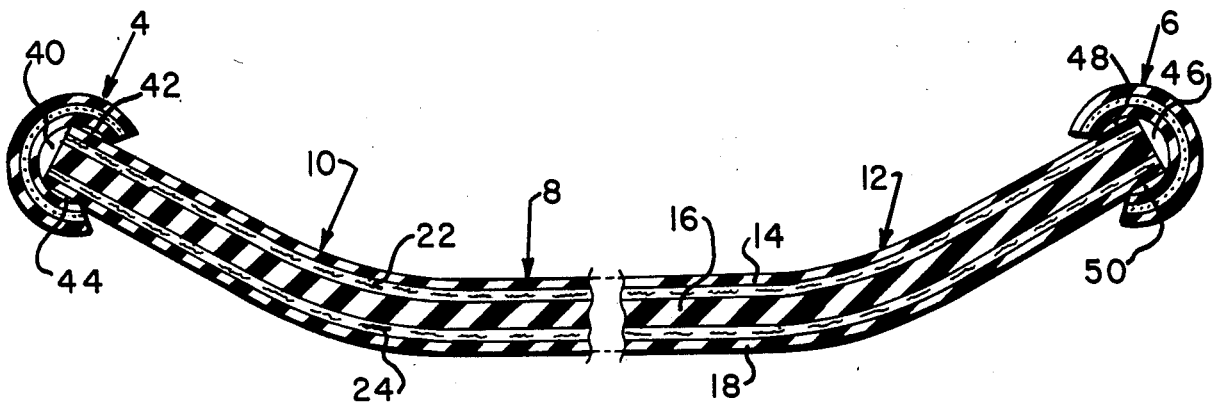
FIG. 1 is a partially fragmented cross sectional illustration of one form of the conveyor belt assembly of the present invention.
Figure 2:
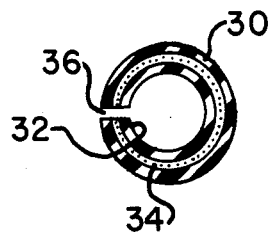
FIG. 2 is a partially schematic cross sectional illustration of a form of protective means employed in the present invention.

Referring now more specifically to FIGS. 1 and 2, a preferred embodiment of the present invention will now be considered. As is shown in FIG. 1, the conveyor belt has a generally flat central region and a pair of generally upwardly and outwardly sloped sectors 10, 12. Protective means 4, 6 are in protective surrounding relationship with respect to the lateral edges of the conveyor belt.

In the form illustrated in FIG. 1, the belt is of laminated construction and is composed of a resilient material, such as a hard rubber, for example. The belt has an upper resilient layer 14, an intermediate resilient layer 16 and a lower resilient layer 18. Layers 22, 24 are also preferably composed of a resilient material and are interposed between middle layer 16 and, respectively, upper layer 14 and lower layer 18. Reinforcing means which are indicated generally by the markings within otherwise clear layers 22, 24 are provided. In a preferred embodiment of the invention the reinforcing means consists of a plurality of wires either in individual strands or as units tied together by appropriate means. In a preferred embodiment of the invention, one of the layers 22, 24 will have its reinforcing means oriented angularly forwardly of a plane taken transversely perpendicular to the longitudinal axis of the belt by about 5 to 10 degrees and the other layer, 22, 24 will have the reinforcing means offset angularly by about 5 to 12 degrees rearwardly with respect to such a plane.

Referring now to FIG. 2, there is shown a cross section of an elongated tubular article which, in the form shown has an outer layer 30, an inner layer 32 and intermediate layer 34. The intermediate layer 34 is provided with reinforcing means such as a wire or braid construction. It is preferred that the various layers 30, 32, 34 be composed of a resilient material such as a hard rubber and that the reinforcement be metal. As will be described hereinafter, a longitudinal slit 36 has been established entirely through the wall of the tubular member which was originally of substantially circular cross sectional configuration. This slit permits the protective means to be expanded radially so as to permit insertion of a lateral edge of the belt and resilient retention of the protective means on the belt edge.

Referring to FIG. 1 again, there is shown protective means in the form of resilient tubular members 4, 6, each of which is an engagement with the belt edges. The configuration of the expanded protective members 4, 6 and the belt edges are such that a plurality of cushioning air pockets 40, 42, 44, 46, 48 50 are defined therebetween. These voids serve to permit a cushioning effect when the outer portion of the protective members 4, 6 are deformed or in contact with other portions of the equipment such as guide rollers, for example. If desired, the belt edge profile and configuration of the protective member may be altered so as to provide for a different number or size of air pockets. It is also noted that the surrounding relationship between the protective members 4, 6 and the lateral belt edges resists contact between the lateral belt edges and other portions of the equipment, thereby minimizing wear through such contact. Also, as the conveyor belt, in the form shown, is of laminate construction, the protective members 4, 6 serve to minimize objectionable edge delamination which might otherwise result from flexing of the belt as well as wearing contact between the belt edge and other portions of the equipment or the material being transported.

It is preferred that the protective members 4, 6 be substantially coextensive with the belt's lateral edges and that they be provided on both edges. In the form shown in FIG. 1, the protective means 4, 6 are resiliently maintained in position. If desired, supplemental or substitute means such as rivets or other mechanical fasteners or mechanical means, for example, may be provided at or adjacent the longitudinal ends of the protective members 4, 6 and at selected intermediate positions. Also, other means of retention such as the use of a suitable adhesive such as epoxy type room temperature vulcanizing or a cyanoacrylate ester, for example, may be applied, preferably substantially longitudinally continuous with the protective means 4, 6, in order to supplement the resilient retention or, in the alternative, to serve as the principal means of retention. In general, in order to facilitate removal of protective members 4, 6 for replacement, the strength of the adhesive bond should be less than the strength of the protective member. It will be appreciated, that one of the advantages of the present invention is that the protective members 4, 6 may be replaced after a period of use and wear. Replacement may be accomplished more readily where principal reliance is placed upon resilient connection with or without local supplementary retention means.

Figure 3:
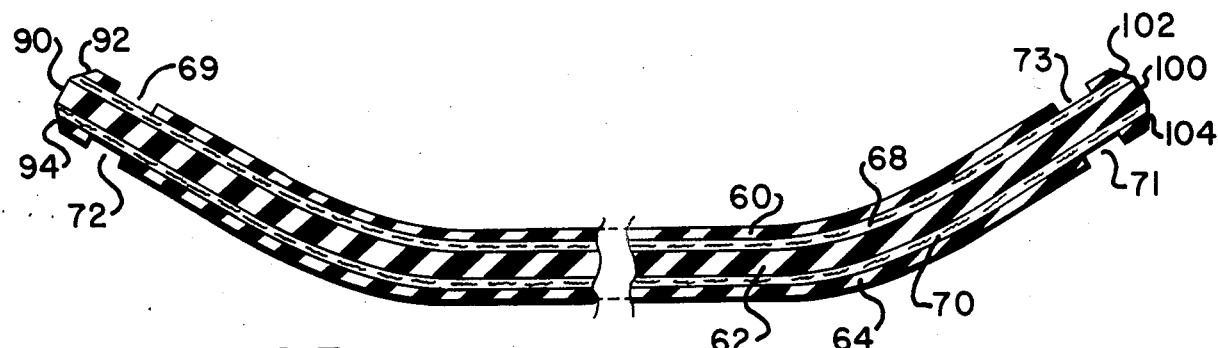
FIG. 3 is a fragmentary cross sectional illustration of a modified form of conveyor belt adapted for use in the conveyor belt assembly of the present invention.
Figure 4:
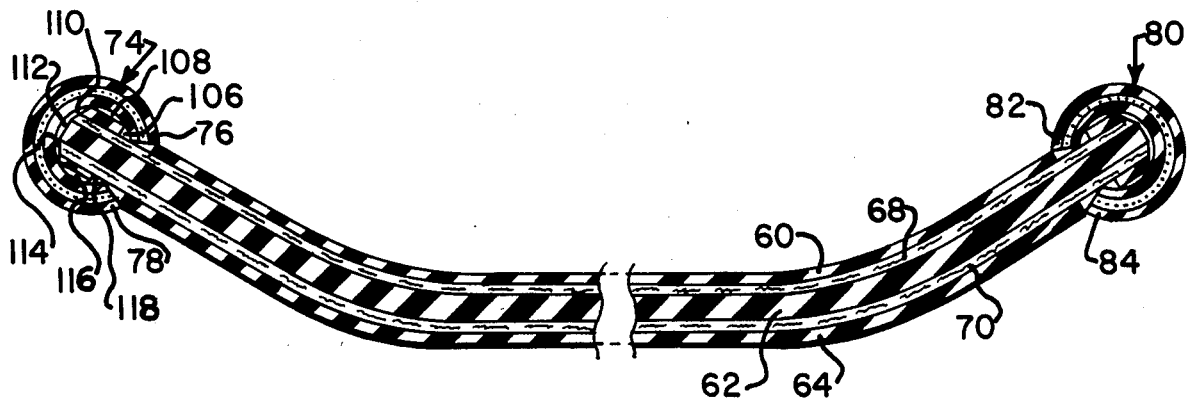
FIG. 4 is a fragmentary cross sectional illustration of a conveyor belt assembly of the present invention including the belt shown in FIG. 3.

Referring now to FIGS. 3 and 4, a modified version of the invention will be considered. In this embodiment, which shows essentially the same belt and protective member construction as in FIGS. 1 and 2, the belt has upper layer 60, intermediate layer 62 and lower layer 64 with interposed reinforced layer 68, 70. Adjacent one lateral edge of the belt are a pair of generally aligned notches 69, 72, which in the form shown are formed, respectively, in layer 60 and layer 64. Similarly, generally aligned notches 71, 73 are formed adjacent the other lateral edge. As is shown in FIG. 4, protective member 74 has its free edges 76, 78 received, respectively, within notches 69, 72. Similarly, protective member 80 has its free ends 82, 84 received, respectively, within notches 73, 71. In this fashion, the resilient retention of the protective members in protective surrounding relationship with respect to the belt's lateral edges is enhanced as a result of the mechanical interfit between the protective member edges and the notches or recesses. If desired, the other securing means mentioned hereinbefore may be employed in this embodiment as well.

Also to be noted in FIGS. 3 and 4 is the shape of the lateral edges. In the belt shown in FIG. 1, the edge surfaces were generally flat and oriented substantially perpendicular with respect to the upper and lower belt surfaces. In the form shown in FIG. 3 belt edge 90 is connected to the upper surface of the belt by angularly disposed surface 92 and to the lower surface of the belt by angularly disposed connecting surface 94. Similarly, belt edge 100 is connected to upper surface of the belt by connecting surface 102 and to the lower surface of the belt by connecting surface 104. One of the benefits achieved by this configuration is the creation of additional cushioning air pockets of reduced size with respect to those of FIG. 1 between protective members 74, 78 and the adjacent portions of the belt. For example, air pockets 106, 108, 110, 112, 114, 116, 118 are provided between protective member 74 and the adjacent lateral belt edge. Similar pockets are provided between protective member 80 and the adjacent belt portion. As the size of the air spaces is reduced, more points of contact between the protective members and the belt edge 15 provided thereby providing enhanced reinforcement of the belt edge.

Figure 5:
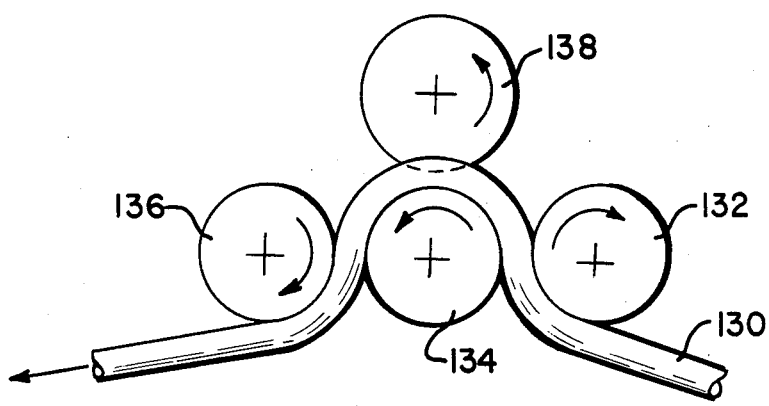
FIG. 5 illustrates a form of apparatus for slitting the protective member of the present invention.
Figure 6:
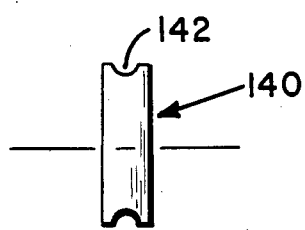
FIG. 6 is an elevational view of a form of support roller employed in FIG. 5.

Referring to FIGS. 5 and 6, a convenient means of manufacturing the protective member of the present invention will be considered. An elongated resilient tubular member either precut to the desired ultimate length for the protective member or of greater length is fed by means of rolls 132, 134, 136 at least one of which is power driven in the direction indicated by the arrow. An overlying cutter disc 138 is so positioned with respect to the hose 130 as to provide a slit such as 36 in FIG. 2, entirely through one wall of the tubular member 130 without contacting the opposite wall. The cutter disc 138 may be driven by any suitable means. FIG. 6 illustrates a side view of a profile of a roll 140 having a recess 142 for receipt of the tubular member 130. Such a roll construction may be employed advantageously in rolls 132, 134, 136.

Figure 7:
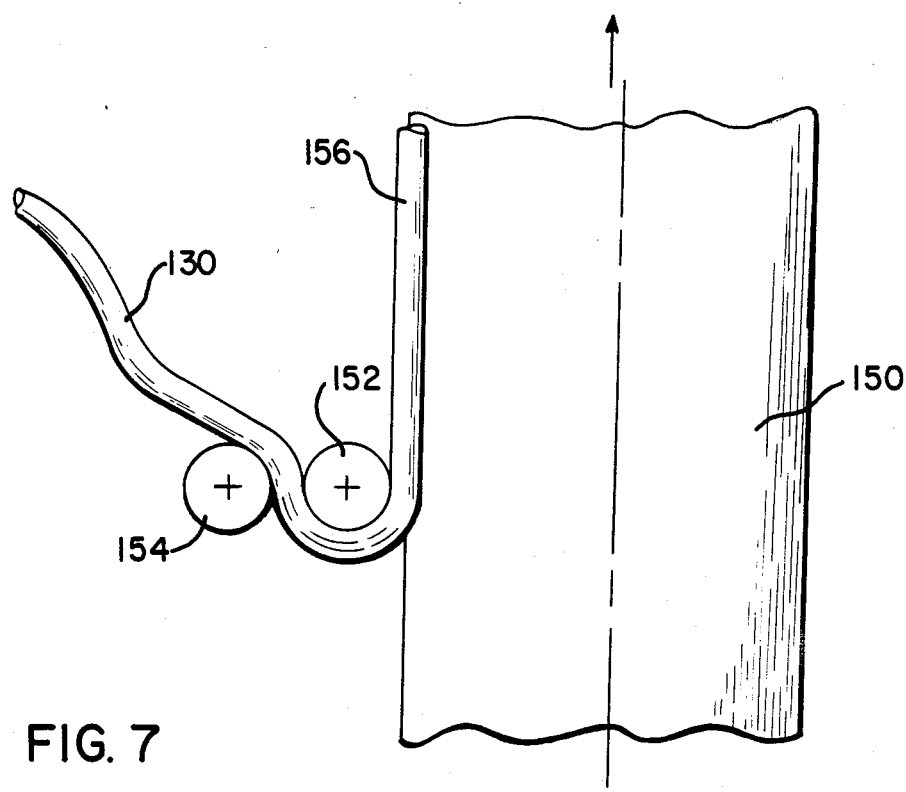
FIG. 7 is a schematic illustration of a means for sequentially applying the protective means of the present invention to a lateral edge of a conveyor belt.

Referring now to FIG. 7, a means of applying the protective member 130 to belt 150 will now be considered. In the form shown, portion 156 of protective member 130 has been secured to a lateral edge of belt 150. In initiating such connection, the tubular member 130 is slit and the leading edge thereof is circumferentially enlarged so as to position it in clamped relationship with respect to the lateral edge of the belt. As the belt is advanced in the direction indicated by the arrow in FIG. 7, guide rolls 152, 154 serve to sequentially guide the protective member 130 onto the belt edge with roll 152 applying pressure to urge the protective member into intimate contact with the lateral edge.

It will be appreciated, therefore, that the present invention provides an effective and economical means for protectively shielding the lateral edges of conveyor belts and particularly belts of the type designed for carrying loose materials such as minerals and ore, including coal, by providing replaceable protective members. The protective members not only provide a covering to resist direct contact between the belt edges and adjacent equipment as well as the materials being transported, but also, resists belt edge delamination.

Whereas particular embodiments of the invention have been described above for purposes of illustration, it will be appreciated by those skilled in the art that numerous variations of the details may be made without departing from the invention as described in the appended claims.

I claim:

1. A conveyor belt assembly of the type capable of traversing a curved horizontal path, said assembly comprising
    an elongatable troughed conveyor belt capable of traversing a curved horizontal path,
    elongated protective means secured to a lateral edge of said conveyor belt for protection thereof during said traverse of said curved horizontal path, and
    said protective means being a resilient tubular member having a longitudinal slit therein and being in circumferentially expanded engagement with said conveyor belt.

2. The conveyor belt assembly of claim 1 including said protective means being of generally circular cross sectional configuration in unexpanded condition.

3. The conveyor belt assembly of claim 1 including portions of the interior surface of said protective means being spaced from adjacent portions of said belt to define cushioning air spaces therebetween.

4. The conveyor belt assembly of claim 3 including said protective means having reinforcing means disposed therein.

5. The conveyor belt assembly of claim 4 including said protective means having an external resilient ply, an internal resilient ply and an intermediate ply, and
    said reinforcing means being disposed within said intermediate ply.

6. The conveyor belt assembly of claim 3 including said protective means secured adjacent to both said lateral edges of said conveyor belt.

7. The conveyor belt assembly of claim 6 including said conveyor belt being generally transversely reinforced.

8. The conveyor belt assembly of claim 1 including recess means formed within said belt for receiving a portion of said protective means, and
    a portion of said protective means disposed within said recess means.

9. The conveyor belt assembly of claim 8 including said recess means having a recess in the upper surface of said belt and a recess in the lower surface of said belt.

10. The conveyor belt assembly of claim 9 including a pair of said recesses disposed generally adjacent to one said belt edge.

11. The conveyor belt assembly of claim 10 including a second pair of said recesses disposed generally adjacent the other said belt edge.

12. The conveyor belt assembly of claim 11 including a plurality of cushioning air spaces formed between said protective means and said belt.

13. The conveyor belt assembly of claim 1 including means for securing said protective means to said belt.

14. The conveyor belt assembly of claim 3 including said protective means being longitudinally generally coextensive with said belt.

15. The conveyor belt assembly of claim 1 including said protective means being at least partially maintained in said engagement with said belt through resiliency of said protective means.

16. The conveyor belt assembly of claim 13 including said securing means including adhesive means.

17. The conveyor belt assembly of claim 13 including said securing means including mechanical fastener means.

18. A method of protecting the edge of an elongatable troughed conveyor belt, said conveyor belt capable of traversing a horizontal path curved with respect to the longitudinal extent of said conveyor belt, said method comprising
    providing an elongated tubular resilient member,
    slitting said tubular resilient member longitudinally to permit resilient circumferential expansion of said member, circumferentially expanding said member, and introducing a lateral edge of said belt into said expanded member, and releasing said resilient tubular member so as to effect engagement between said member and said belt.

19. The method of protecting a conveyor belt of claim 18 including providing said belt with recess means for receiving opposed edges of said slit tubular resilient member, and positioning said slit edges in said recess.

20. The method of protecting a conveyor belt of claim 18 including positioning said member on said belt so as to define cushioning air spaces therebetween.

21. The method of protecting a conveyor belt of claim 18 including placing said resilient members on both lateral edges of said belt.

* * * * *